US005708553A

United States Patent [19]

Hung

[11] Patent Number: 5,708,553

[45] Date of Patent: Jan. 13, 1998

[54] AUTOMATIC SWITCHING-OFF STRUCTURE FOR PROTECTING ELECTRONIC DEVICE FROM BURNING

[76] Inventor: Je Hung, No. 12, Lane 11, Sec. 1, Yon-An North Rd., San-Chung City, Taipei Hsien, Taiwan

[21] Appl. No.: 683,000

[22] Filed: Jul. 18, 1996

[51] Int. Cl.[6] .......... H02H 5/04

[52] U.S. Cl. .......... 361/103; 337/114; 337/120; 337/403

[58] Field of Search .......... 361/103–106, 361/93, 94; 337/4–6, 114, 120–121, 123, 139–140, 388, 401, 403, 404–405, 406–407

[56] References Cited

U.S. PATENT DOCUMENTS

| | | | |
|---|---|---|---|
| 4,096,464 | 6/1978 | Dennis et al. | 337/5 |
| 4,101,862 | 7/1978 | Takagi et al. | 361/103 |
| 5,023,744 | 6/1991 | Hofsass | 361/26 |
| 5,363,083 | 11/1994 | Fischer | 337/407 |
| 5,438,309 | 8/1995 | Krumme | 337/140 |

*Primary Examiner*—Jeffrey A. Gaffin
*Assistant Examiner*—Michael J. Sherry
*Attorney, Agent, or Firm*—Bacon & Thomas

[57] ABSTRACT

An electronic device integrally formed with an automatic switching-off structure for protecting the device from overheating. At least one conducting lead of the electronic device is mechanically and electrically connected to its corresponding electrode by means of a solder column having desired melting point, with an appropriate spacing being kept between the conducting lead and the electrode. The coating layer of the electronic device is formed by a material such as epoxy resin which will soften and release a gaseous substance when heated to a temperature near its ignition point. When the temperature of the device exceeds the melting point of the solder, the solder column melts to break the electrical circuit and prevent overheating of the device. If the electronic device per se has higher working temperature, the coating layer is formed by a material having a higher ignition point such as silicon resin or silicon rubber which will not soften and expand when heated to a temperature near its ignition point. In this case, a compressed spring is interposed between the conducting lead and the electrode, and the coating layer must include, in the part enwrapping the solder column, a breakage or a weak portion which is apt to break upon suffering a tensile force in the direction generally parallel to the solder column.

5 Claims, 4 Drawing Sheets

AUTOMATIC SWITCHING-OFF STRUCTURE FOR PROTECTING ELECTRONIC DEVICE FROM BURNING

BACKGROUND OF THE INVENTION

1. Field of the Invention

This invention relates to a safety structure for protecting electronic devices from burning due to overheat. in particular, this invention relates to an electronic device integrally formed with an automatic switching-off structure which will automatically switch off the circuit containing the electronic device when the latter is overheated. Hereinunder, the combined construction of the electronic device and the integrally formed automatic switching-off structure according to this invention is sometimes referred to as simply the "combined assembly" for short.

2. Background of the Invention

The construction of a conventional electronic device will now be described with reference to FIGS. 1 through 5. A conventional electronic device mainly comprises a disk-shaped ceramic body 1, having the required electrical properties for an electronic device (such as a surge absorber, a positive temperature coefficient thermistor, a negative temperature coefficient thermistor and a ceramic capacitor etc.); a first electrode 21, attached to the first lateral side of the ceramic body 1; a second electrode 22 attached to the second lateral side of the ceramic body 1; a first conducting lead 31 electrically connected to the first electrode 21; a second conducting lead 32 electrically connected to the second electrode 22; and a coating layer 4 coated around an assembly (see FIGS. 2 and 3) formed by appropriately connecting the ceramic body 1, the first electrode 21, the second electrode 22, the first conducting lead 31 and the second conducting lead 32 so s to form an outer protection and insulation layer. The numeral 5 denotes solder for soldering the conducting leads 31, 32 to the electrodes 21, 22.

The coating layer 4 is usually formed by organic materials, such as resins or rubbers, which are all combustible at various higher temperatures. Consequently, a common problem for various coating layers is the possibility of burning due to overheating. Specifically, due to unforeseen and inevitable factors, the ceramic body 1 of an electronic device is apt to generate, under a working voltage or a higher voltage, an abnormally high current accompanied by excess heat which keeps on raising the temperature of the electronic device and thus makes the electronic device unstable. When the electronic device is finally heated to an extent resulting in a so-called "thermal run away" phenomenon (namely, heat generation in the electronic device is much higher than heat dissipation so as to raise the temperature of the electronic device dramatically), the temperature of the electronic device may exceed the ignition point of the coating substance and thus cause fire on the electronic device and peripheral elements. Consequently, there are various safety testing standards which require a tested electronic device or equipment installed with such an electronic device to switch off automatically when a predetermined high current is applied to it. Due to the requirement of such safety testing standards, electronic devices and related equipment having higher safety must be adopted so as to prevent fire and to guarantee the safety of users.

It is common sense that an electric circuit can be easily protected from burning by use of a current fuse which will automatically switch off when excess current flows through it. However, for a single electronic device, a rather small current flowing through its may sometimes raise its temperature to an extent high enough to ignite its coating layer. The current which causes ignition of the coating layer may be much lower than the rated current of any commercially available fuses. Consequently, no suitable "current fuse" can be used to reliably prevent the electronic device from burning due to excess current.

Alternatively, a so-called "thermal fuse" which will automatically switch off the related electric circuit upon suffering overheating may be adopted to avoid the burning of an electronic device due to overheat.

In view of this, a Japanese company has developed a surge absorber having a composite function as shown in FIG. 6. This product is formed by additionally soldering 61 a ready-made thermal fuse 60 to one of the electrode 21 in a common electronic device (see also FIG. 4), and then coat the electronic device together with the thermal fuse to form an integral combined element. When such a combined element is severely heated due to abnormally high current flowing through its, the generated heat will be transmitted to the thermal fuse 60 and melt the low melting point alloy (not shown) in the fuse so as to switch off the circuit containing the combined element. Accordingly, the temperature of the combined assembly will be lowered so as to avoid risk of burning.

Though the basic concept of the above prior combined assembly is good, it still suffers from some drawbacks. first, the use of an extra thermal fuse will greatly increase the cost of the product. Second, the soldering operation of the thermal fuse 60 will further raise the manufacturing cost and the price of the product, and thus lower the acceptability of this product by the users. On the other hand, if a user himself would try to solder a ready-made thermal fuse to a circuit board in the vicinity of a surge absorber so as to obtain the same effect as the above product, it is doubtful whether the heat generated by the surge absorber can be reliably transmitted to the thermal fuse.

SUMMARY OF THE INVENTION

In view of the afore-described drawbacks of prior automatic switching-off structure, the primary object of this invention is to provide a "combined assembly" of an electronic device and integrally formed automatic switching-off structure for protecting the electronic device from burning due to overheating which can be mass produced at greatly reduced cost by a very simple manufacturing process, and which can reliably guarantee the safety of electronic devices when in use.

The electronic device, such as a surge absorber, a positive temperature coefficient thermistor, a negative temperature coefficient thermistor or a ceramic capacitor is integrally formed with an automatic switching-off structure for protecting it against overheating. The combined assembly of the electronic device and the integrally formed automatic switching-off structure can be mass produced at greatly reduced cost by a very simple manufacturing process, and can reliably guarantee the absolute safety of electronic devices when in use.

At least one of the conducting leads of the electronic device is mechanically and electrically connected to its corresponding electrode by means of a solder column having a predetermined melting point, with a predetermined spacing being kept between the conducting lead and the electrode. The coating layer of the electronic device is formed by a material, such as epoxy resin, which will soften and release a gaseous substance when heated to a temperature near its ignition point. Part of the released gaseous substance accumulates in a gap between the electrode and the coating so as to gradually push the softened resin away from the electrode. Since the solder column has been melted, the continuous outward expansion of the resin will break the solder column and break the electrical connection between the conducting lead and the electrode.

If the electronic device has an elevated working temperature, the coating layer must be formed by a material having a higher ignition point, such as silicon resin or silicon rubber, which will not soften and expand when heated to a temperature near its ignition point. In this case, a compressed spring is interposed between the conducting lead and the electrode, and the coating layer must include, in the part enwrapping the solder column, a breakage or a weak portion which will break upon suffering a tensile force in a direction generally parallel to the solder column.

DETAILED DESCRIPTION OF THE PREFERRED EMBODIMENTS

Figure 1:
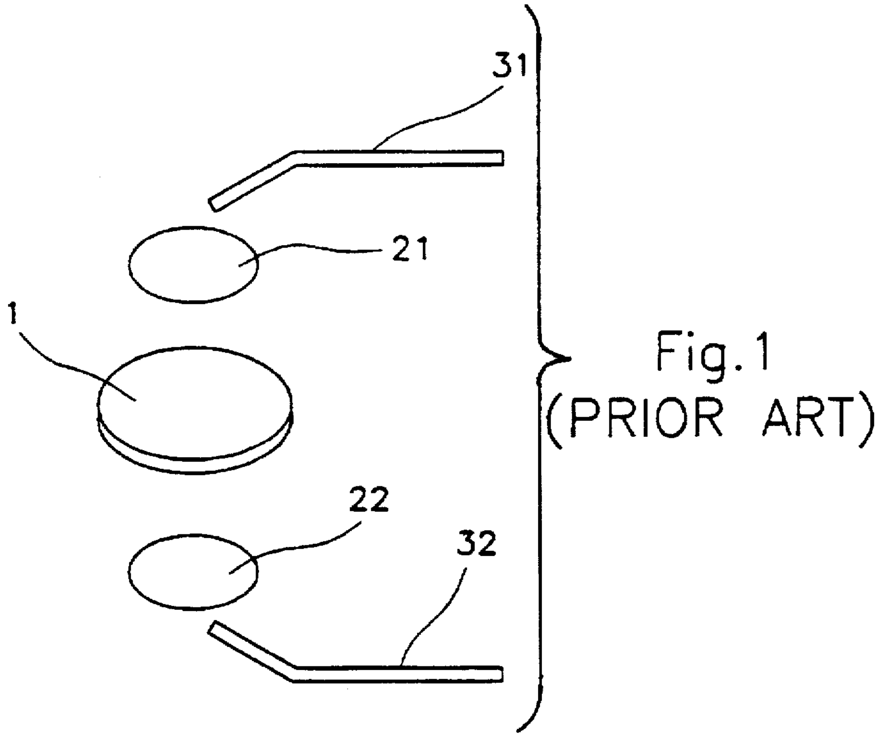
Fig.1 (PRIOR ART)
FIG. 1 is an exploded perspective view illustrating a conventional electronic device such as a surge absorber, a positive temperature coefficient thermistor, a negative temperature coefficient thermistor and a ceramic capacitor etc., which is shown in the state before an outer coating layer is coated.
Figure 2:
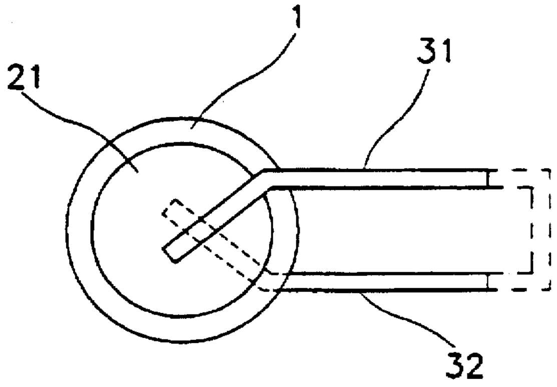
Fig.2 (PRIOR ART)
FIG. 2 is an assembly front view of those components shown in FIG. 1.
Figure 3:
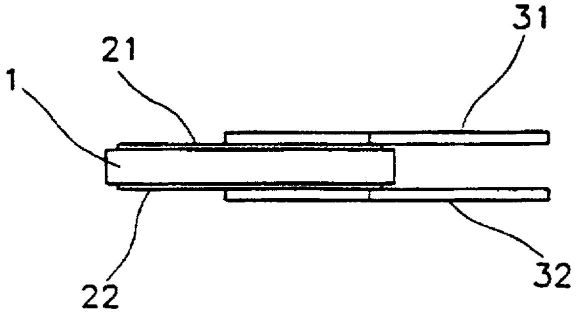
Fig.3 (PRIOR ART)
FIG. 3 is an assembly side view of those components shown in FIG. 1.
Figure 4:
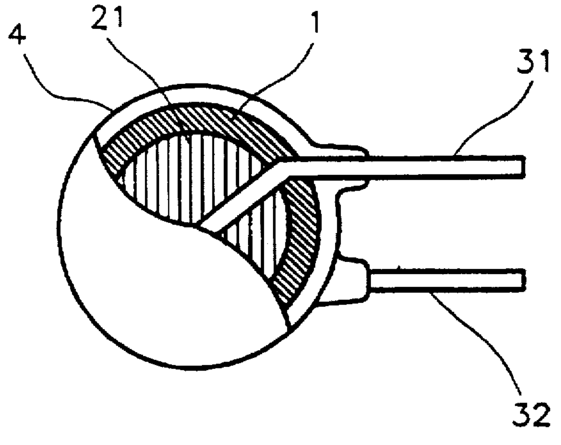
Fig.4 (PRIOR ART)
FIG. 4 is an assembly front view similar to FIG. 2 with an outer coating layer, further coated around the assembly shown in FIG. 2, being partially removed to disclose its interior.
Figure 5:
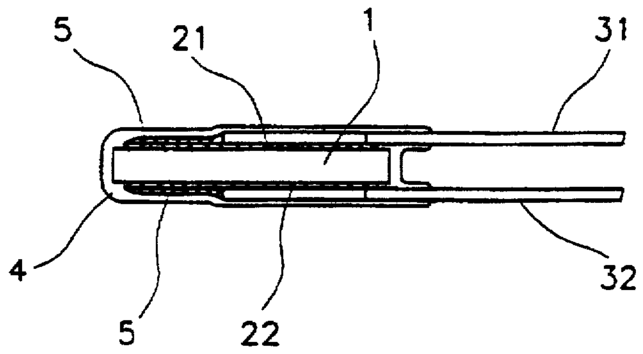
Fig.5 (PRIOR ART)
FIG. 5 is a side sectional view of the conventional electronic device shown in FIG. 4.
Figure 6:
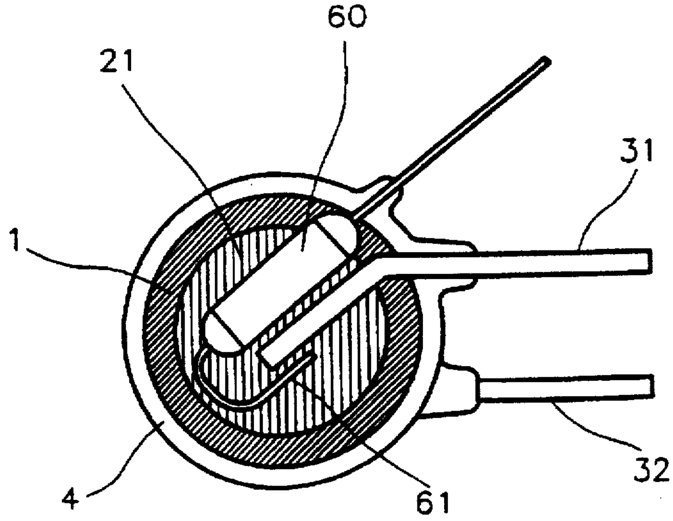
Fig.6 (PRIOR ART)
FIG. 6 is an assembly front sectional view similar to FIG. 4 in which a commercially available thermal fuse is further electrically connected to the electrode of a conventional electronic device so as to integrally form an automatic switching-off structure for protecting the electronic device from burning, and in which the outer coating layer is partially removed to disclose its interior.

Before describing the embodiments of the combined assembly according to this invention, the soldering operation for conducting leads in a prior electronic device (see FIGS. 1 through 5) must be described. First, two conducting leads 31,32 connected together at their first ends (shown in FIG. 2 by phantom line) are made to clamp, at their opened second ends, a disk-shaped ceramic body 1 having electrodes 21,22 attached onto the lateral sides thereof for electric conduction purpose. Then, the assembly consisting of the ceramic body 1, the electrodes 21, 22 and the conducting leads 31,32 is put into a solder bath (not shown) for two or three seconds so as to firmly connect the conducting leads 31,32 to the electrodes 21,22 by solder 5. Subsequently, the connected first ends of the conducting leads 31,32 are cut off. At last, the soldered assembly is put, at one end thereof, into another coating substance bath (not shown) so as to form an insulating outer coating layer 4 around the same end of the soldered assembly. Thus, the final product as shown in FIGS. 4 and 5 is obtained.

Figure 7:
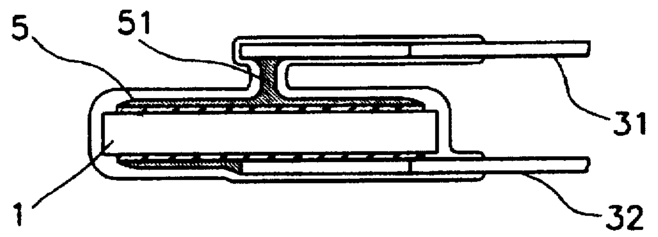
FIG. 7 is a side sectional view showing a combined assembly according to the first embodiment of this invention.
Figure 11:
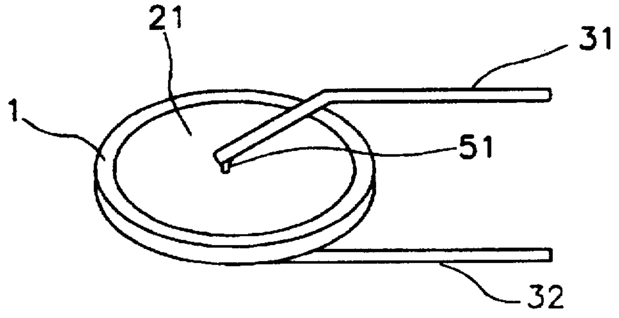
FIG. 11 is a perspective view of the combined assembly as shown in FIG. 7, with the coating layer being removed so as to disclose its interior.

The combined assembly according to the first embodiment of this invention will now be described with reference to FIGS. 7 and 11. FIG. 7 is a side sectional view of this combined assembly, and FIG. 11 is a perspective view of the same combined assembly, with its coating layer 4 being removed so as to disclose its interior. In comparison with the prior electronic device show in FIG. 5, it can be found that the combined assembly according to the first embodiment of this invention is only slightly different from a prior electronic device in its construction. Specifically, this combined assembly comprises a disk-shaped ceramic body 1, having required electrical property for an electronic device; a first electrode 21 attached to the first lateral side of the ceramic body 1; a second electrode 22 attached to the second lateral side of the ceramic body 1; a first conducting lead 31 electrically connected to the first electrode 21; a second conducting lead 32 electrically connected to the second electrode 22; a second coating layer 4 coated around an assembly formed by appropriately connecting the ceramic body 1, the first electrode 21, the second electrode 22, the first conducting lead 31 and the second conducting lead 32 so as to form an outer protection and insulation layer. The characteristic of This combined assembly resides in that the first conducting lead 31 is mechanically and electrically connected to the first electrode 21 by means of a solder column 51 having a desired melting point, with a spacing being kept between the first conducting lead 31 and the first electrode 21. In addition, the coating layer 4 is preferably formed by epoxy resin which is rather hard after being cured in coating process. However, it has been found by the inventor through experiments that the coating layer 4 formed by epoxy resin will soften and release a gaseous substance when heated to a temperature near the ignition point of the epoxy resin, and it is considered that the gaseous substance may be resulted form those hardening agents added to the epoxy resin.

Figure 8A:
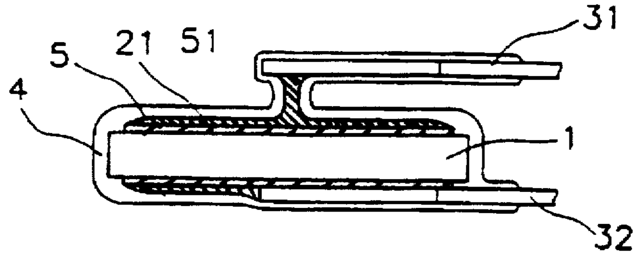
FIGS. 8(A) through (E) are side sectional views showing consecutive steps for the automatic switching-off process of the combined assembly s illustrated in FIG. 7.
Figure 8B:
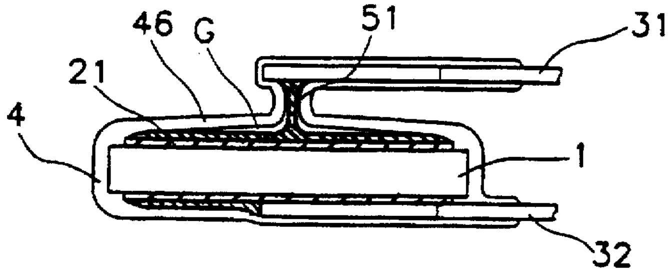
Figure 8C:
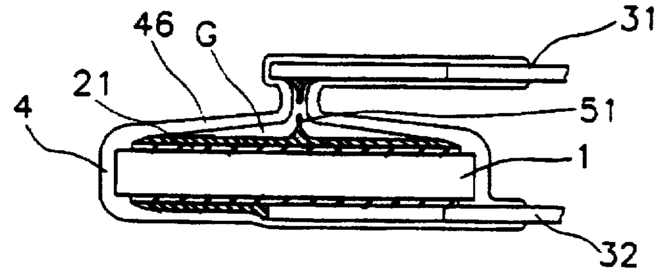
Figure 8D:
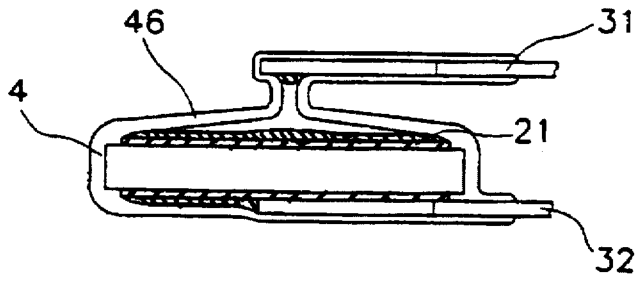
Figure 8E:
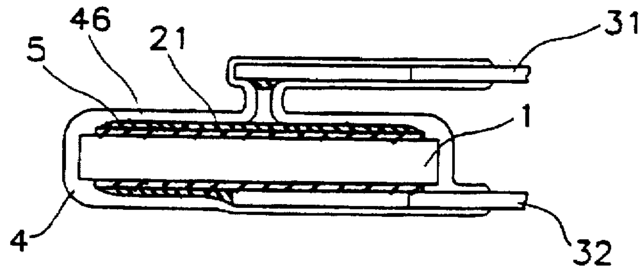

FIGS. 8(A) through (E) are side sectional views showing consecutive steps in the automatic switching-off process of the combined assembly as illustrated in FIG. 7. FIG. 8(A) shows the combined assembly of this invention in a normal operating state wherein the combined assembly has the same electrical functions as a prior electronic device. However, when the combined assembly is subjected to an abnormally high current, its temperature will be raised continuously. At last, when the temperature reaches the melting point of the solder (for example, 183° C., the eutectic point for tin and lead alloy), the solder 5 (including the solder column 51 ) begins to melt into a liquid state which still electrically connects the first conducting lead 31 and the first electrode 21. At this time, as described above, the epoxy resin 46 constituting the coating layer 4 begins to soften and release a gaseous substance (see FIG. 8(B)), and part of the released gaseous substance accumulates in the gap G between the electrode 21 and the resin 46 so as to gradually push the softened resin 46 away from the electrode 21. Since the solder column 51 has been melted, the continuous outward expansion of the resin 46 will finally break the solder column 51 and, thus, the electrical connection between the conducting lead 31 and the electrode 21 (see FIG. 8(C)). After the electrical connection has been broken, the heat source of the combined assembly disappears, and the temperature of the latter begins to decrease. Meanwhile, the residual solder 51 between the conducting lead 31 and the electrode 21 retracts to stick to either the conducting lead 31 of the electrode 21 (see FIG. 8(D)). After the temperature has been lowered to an extent or after the resin 46 has been broken due to over expansion, the resin 46 will restore to its original position (see FIG. 8(E)). However, the electrical connection between the conducting lead 31 and the electrode 21 remains broken. Consequently, the danger of causing fire on the "combined assembly" due to overheating can be avoided, and the safety of the electronic device can be assured. For achieving the same purpose, the coating layer 4 may alternatively be made of any insulative material which will properly deform when heated to a temperature near its ignition point, even though no gaseous substance is released.

In the case of electronic devices, such as positive or negative temperature coefficient thermistor, which per se have higher working temperatures, the coating layer 4 must be formed by materials having higher ignition points, such as silicon resin or silicon rubber, instead of epoxy resin. Since such kind of coating layer (coating substance) having a higher ignition point will not soften and expand as a coating layer formed by epoxy resin does when heated to a temperature near its ignition point, another type of combined assembly according to the second embodiment of this invention must be used for automatic switching-off purposes. This combined assembly will now be described with reference to FIGS. 9 and 10, among which FIG. 9 is its side sectional view, and FIG. 10 is a partly enlarged detailed view of the point "X" in FIG. 9.

Figure 9:
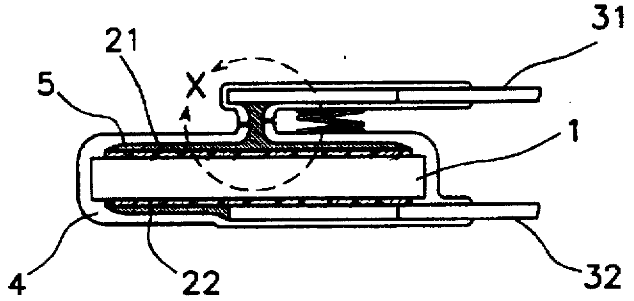
FIG. 9 is a side sectional view of another combined assembly according to the second embodiment of this invention.
Figure 10:
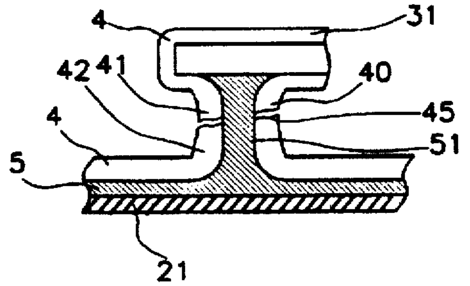
FIG. 10 is a partly enlarge detailed view of the portion "X" in FIG. 9.

As shown in FIGS. 9, 10 and 7, the combined assembly according to the second embodiment (FIGS. 9 and 10) of this invention is different from the first embodiment (FIG. 7) mainly in that a compressed spring 7 is further interposed between the portion of coating layer 4 outside of the conducting lead 31 and that outside of the electrode 21 so as to exert at its two ends, respectively, reactive forces on the conducting lead 31 and the electrode 21. Besides, a breakage 45 (or a weak portion which is apt to break upon suffering a tensile force in the direction generally parallel to the solder column 51 ) is formed in the part of the coating layer 4 enclosing the solder column 51 so that the conducting lead 31 is mechanically connected to the electrode 21 only by the solder column 51. When, due to an abnormally high current flowing through the combined assembly, the solder column 51 is heated to melt into a liquid state, it will be unable to mechanically connect the conducting lead 31 and the electrode 21 any longer. In this instance, the compressed spring 7 will push the conducting lead 31 away from the electrode 21 to break the melted solder column 51 and, thus, to automatically switch off the combined assembly. Accordingly, by use of this "combined assembly" according to the second embodiment, the object of preventing the electrode device (or the combined assembly as a whole) from burning due to overheating can be achieved as in the first embodiment.

The structure according to the second embodiment, though somewhat more complicated in comparison with the first embodiment, has an advantage over the first embodiment in that damaged electronic devices (namely, those electronic devices whose conducting leads have been pushed away from corresponding electrodes as explained above) in an electric circuit are visible and can be readily located. Consequently, when required, even an electronic device having a coating layer formed by epoxy resin may preferably include the above-described automatic switching-off structure with a compressed spring between the conducting lead and the electrode so as to make damaged electronic devices visible.

In conclusion, the following effects can be obtained by use of the above-described combined assemblies in accordance with this invention. The object of protecting an electronic device from burning due to excess heat generated by abnormally high current flowing therethrough can be readily attained by merely a very simple change with respect to a prior electronic device. Consequently, combined assemblies having a highly reliable burning prevention function according to this invention can be mass produced at greatly reduced cost by a very simple manufacturing process.

Figure 12:
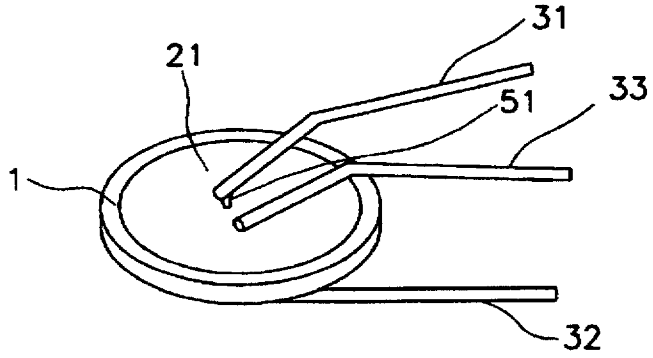
FIG. 12 is a perspective view of another electronic device, slightly different from that shown in FIG. 11, integrally formed with an automatic switching-off structure.

The above describes a few preferred embodiments of this invention, such embodiments are used to illustrate only and not to limit this invention. Various variations may be made and embodied without departing from the scope of the substantial contents of this invention, such variations will still belong to the scope of this invention. For instance, in each of the aforementioned embodiments, the number of conducting leads in an electronic device is described and shown (in the attached drawings) to be only tow, namely conducting leads 31 and 32 (see FIG. 11 ). However, this invention may also be applied to an electronic device having three conducting leads 31, 32 and 33 (see FIG. 12). Therefore, the scope of this invention is defined by the following appended claims.

What is claimed is:

1. A combined assembly of an electronic device and integrally formed automatic switching-off structure for protecting the electronic device from burning, comprising:

a ceramic body with electrical properties, having a first lateral side and a second lateral side;

a first electrode attached to said first lateral side of said ceramic body;

a second electrode attached to said second lateral side of said ceramic body;

first and second conducting leads;

a second conducting lead electrically connected to said second electrode; and a coating layer coated around an assembly formed by appropriately connected said ceramic body, said first electrode, said second electrode, said first conducting lead and said second conducting lead so as to form an outer protection layer;

characterized in:

at least one of said first and second conducting leads is spaced apart from the corresponding electrode so as to be mechanically and electrically connected to the corresponding electrode by a column of solder extending outwardly from the corresponding electrode and having a predetermined melting point; and a coating layer coated around said ceramic body, said first electrode second electrode said first conducting lead and said second conducting lead so as to form an outer protection layer, whereby said coating layer is formed of a material which will soften and release a gaseous substance when heated to a predetermined temperature near its ignition point.

2. A combined assembly as claimed in claim 1, wherein said coating layer comprises an epoxy resin.

3. A combined assembly of an electronic device and integrally formed automatic switching-off structure for protecting the electronic device from burning, comprising:

a ceramic body with required electrical properties, having a first lateral side and a second lateral side;

a first electrode attached to said first lateral side of said ceramic body:

a second electrode attached to said second lateral side of said ceramic body;

a first conducting lead electrically connected to said first electrode;

a second conducting lead electrically connected to said second electrode; and a coating layer coated around an assembly formed by appropriately connecting said ceramic body, said first electrode, said second electrode, said first conducting lead and said second conducting lead so as to form an outer protection layer;

characterized in:

that said first conducting lead is mechanically and electrically connected to said first electrode by means of a solder column having proper melting point, with a proper spacing being kept between said first conducting lead and said first electrode;

that into said spacing between said first conducting lead and said first electrode is interposed a spring, in a properly compressed state, which tends to push said first conducting lead and first electrode away from each other; and that said coating layer includes, in the part enwrapping said solder column, a breakage or a weak portion which is apt to break upon suffering a tensile force in the direction generally parallel to said solder column.

4. A combined assembly as claimed in claim 3, wherein said coating layer is made of silicon resin or silicon rubber.

5. A combined assembly of an electronic device and integrally formed automatic switching-off structure for protecting the electronic device from burning, comprising:

a ceramic body with electrical properties, having a first lateral side and a second lateral side;

a first electrode attached to said first lateral side of said ceramic body;

a second electrode attached to said second lateral side of said ceramic body;

first and second conducting lead;

at least one of said first and second conducting leads is spaced apart from the corresponding electrode so as to be mechanically and electrically connected to the corresponding electrode by a column of solder extending outwardly from the corresponding electrodes and having a predetermined melting point; and a coating layer coated around said ceramic body, said first electrode, said second electrode, said first conducting lead and said second conducting lead so as to form an outer protection layer, whereby said coating layer is formed by a material which will deform when heated to a predetermined temperature near its ignition point.

* * * * *